United States Patent [19]

Ancker et al.

[11] E Patent Number: Re. 31,992

[45] Reissued Date of Patent: Sep. 24, 1985

[54] REINFORCEMENT PROMOTERS FOR FILLED THERMOPLASTIC POLYMERS

[75] Inventors: Fred H. Ancker, Warren Township, Union County; Arnold C. Ashcraft, Jr., Hightstown, both of N.J.; Martin S. Leung, Manhattan Beach, Calif.; Audrey Y. Ku, Chesterfield, Mo.

[73] Assignee: Union Carbide Corporation, Danbury, Conn.

[21] Appl. No.: 556,170

[22] Filed: Nov. 29, 1983

Related U.S. Patent Documents

Reissue of:

[64] Patent No.: 4,385,136
Issued: May 24, 1983
Appl. No.: 295,811
Filed: Aug. 27, 1981

[51] Int. Cl.[4] ..... C08K 3/22; C08K 3/26; C08K 3/34; C08K 9/04

[52] U.S. Cl. ..... 523/202; 523/200; 523/215; 523/216; 523/351; 524/425; 524/430; 524/431; 524/432; 524/444; 524/447; 524/449; 524/451; 524/493; 524/497

[58] Field of Search ..... 523/201, 215, 216, 351, 523/200, 202; 524/425, 430, 432, 431, 437, 445, 451, 493, 496, 497

[56] References Cited

U.S. PATENT DOCUMENTS

| | | | |
|---|---|---|---|
| 2,883,357 | 4/1959 | Hardy | 523/216 |
| 3,471,439 | 10/1969 | Bixler et al. | 523/202 |
| 3,519,503 | 7/1970 | Bogler | 524/452 |
| 3,956,230 | 5/1976 | Gaylor | 523/209 |
| 4,187,210 | 2/1980 | Howard, Jr. | 524/430 |
| 4,210,571 | 7/1980 | Herman | 523/216 |
| 4,433,073 | 2/1984 | Sano et al. | 523/201 |

FOREIGN PATENT DOCUMENTS

| | | |
|---|---|---|
| 55-110138 | 8/1980 | Japan . |
| 55-133438 | 10/1980 | Japan . |

OTHER PUBLICATIONS

E. M. Danenberg et al., *Journal of Polymer Science*, vol. 31, pp. 127–153, 195.

E. G. Howard et al., "Ultrahigh Molecular Weight Polyethylene Composites: A New Dimension in Filled Plastics", Preprint of National Tech. Conference of Society of Plastic Engineers, Oct. 1976, pp. 36–38.

Hausglein et al., Applied Polymer Symposia, No. 11, pp. 119–134, 1969.

Hawthorne et al., *Journal of Macromolecular Science, Part A, Chemistry*, vol. (3) pp. 659–671, 1974.

"Silane Coupling Agents in Mineral Filled Composites", Brochure F-43598A, Union Carbide Corp., Feb. 1979.

C. D. Han et al., *Polymer Engineering and Science*, vol. 19, No. 11, pp. 849–854, 1978.

D. E. Cope, Reprint No. 24-E presented at 1979 Annual Technical Conference of Reinforced Plastics Composites Institute (Society of the Plastics Industry).

de Souza et al., "Low-Cost Highly Filled Impact Resistant Thermoplastic Composites", pp. 492–496 of Preprints from Annual Technical Conference of the Society Plastics Engineers.

F. H. Ancker et al., entitled "A Coated Asbestos with Better Coupling", *Plastics Engineering*, pp. 32–36, Jul. 1974.

Newman et al., "Mica Composites of Improved Strength", *Polymer Composites*, vol. 1, pp. 37–43, Sep. 1980.

*Primary Examiner*—Allan M. Lieberman
*Attorney, Agent, or Firm*—Jean B. Mauro

[57] ABSTRACT

A reinforced, filled thermoplastic polymer composition, having increased strength and ductility, contains a reinforcement promoter having at least two reactive olefinic double bonds and a positive promoter index, based on the double bond resonance and polarity, and the promoter adsorptivity.

23 Claims, 1 Drawing Figure

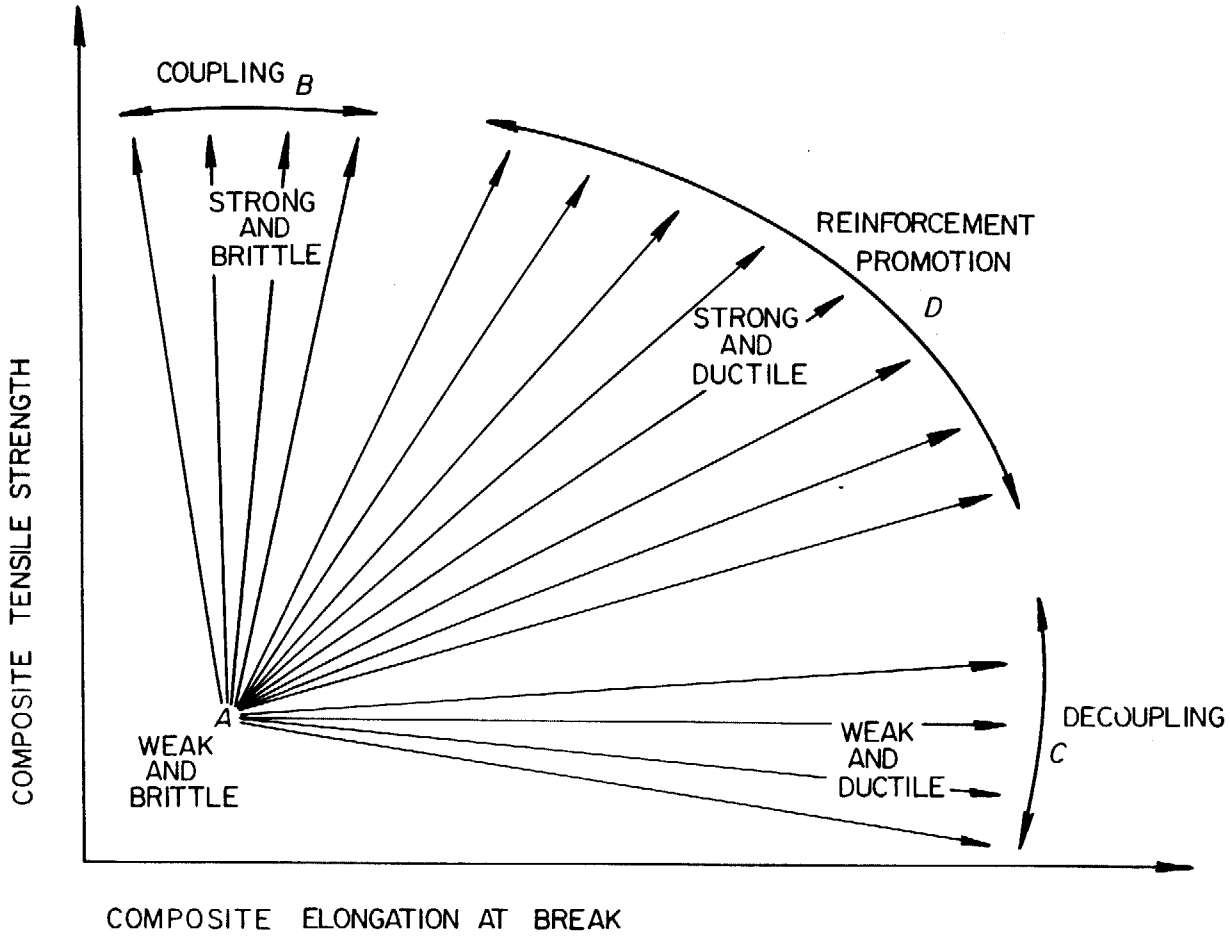
COMPOSITE TENSILE STRENGTH
COUPLING B
STRONG AND BRITTLE
REINFORCEMENT PROMOTION D
STRONG AND DUCTILE
A
WEAK AND BRITTLE
DECOUPLING C
WEAK AND DUCTILE
COMPOSITE ELONGATION AT BREAK

REINFORCEMENT PROMOTERS FOR FILLED THERMOPLASTIC POLYMERS

Matter enclosed in heavy brackets [ ] appears in the original patent but forms no part of this reissue specification; matter printed in italics indicates the additions made by reissue.

CROSS-REFERENCES TO RELATED APPLICATIONS

This application is related to copending patent applications Ser. No. [461,088] *295,812*, entitled "Integral Additives and Methods for Making Filled Thermoplastics" and Ser. No. 295,813, *now U.S. Pat. No. 4,409,342* entitled "Synergistic Reinforcement Promoter Systems for Filled Polymers" both filed concurrently with this application.

BACKGROUND OF THE INVENTION

1. Field of the Invention

This invention relates to a filled, thermoplastic polymer composition containing a reinforcement promoter, and a method for its production. The term "reinforcement promoter" refers to chemicals which provide both improved tensile strength and ductility when combined with a filled thermoplastic polymer.

2. Description of the Prior Art

A broad range of chemicals have been evaluated as filler treatments or interfacial agents in filled polymers with and without the addition of free radical initiators, such as peroxides. Unfortunately, the literature terminology is usually ambiguous and often erroneous. For example, the terms "coupling agent" or "adhesion promoter", which imply that the additives increase the adhesion or bonding between the filler particle and the surrounding polymer matrix, are often used uncritically. Usually there is no proof of any adhesion effect, and the particular additive may function merely as a filler dispersing aid and, sometimes, as a processing aid by reducing the viscosity of the molten, filled composite. In many cases, the mechanical properties reported for the filled polymers even imply that the additive facilitates release of the matrix polymer from the filler particles, such that the so-called coupling agent actually has a decoupling or debonding effect.

The varied behavior of filler treatment additives in filled polymers may be more clearly envisioned with the help of a composite property chart such as that shown in the FIGURE. On this chart, the abscissa or "x" axis represents the elongation at break and the ordinate or "y" axis represents the maximum tensile strength of a filled polymer. The chart presents the relative strength and ductility of filled polymers for specific polymers containing a specified filler loading, but which vary according to the type of interfacial agent which is added to the composition. The area near "A" represents these properties for a filled composite without any interfacial agent added or where the interfacial agent is ineffective for increasing tensile strength or elongation at break. In general, for filler loadings in a range of about 50 weight percent, the tensile strength and the elongation at break will both be quite low, i.e., the filled composite is both weak and brittle. Certain currently used interfacial agents and filler treatments result in increases in tensile strength with little or no increase in elongation such that although the materials get stronger, they remain brittle. These composites are grouped in the area from "A" to "B" and the interfacial agents producing this effect will here be called coupling agents in the strict sense of the word. Other commonly used additives result in gains in elongation at break with little changes or even decreases in tensile strength such that although such composites can become more ductile, they remain weak, and are often best characterized as "cheesy". These composites are grouped in the area from "A" to "C" and the interfacial agents producing this effect will here be termed decoupling agents. Clearly, the interfacial agents which cause a filled polymer to become both strong and tough, i.e., which causes improvements in both tensile strength and ductility, are by far the commercially most attractive composites. These composites would be grouped in the area from "A" to "D". However, not all interfacial agents can be clearly defined as reinforcing, coupling, decoupling or ineffective since, as can be seen from the FIGURE, no sharp boundaries exist between the designated areas. This is particularly evident for composites which exhibit only modest increases in strength or elongation at break, i.e., which approach area "A" in the FIGURE, or composites made with lower filler loadings.

The dramatic mechanical property improvements attained in vulcanized rubbers by melt compounding with carbon black and certain silica and silicate fillers are well known—such that without the use of these so-called reinforcing fillers the commercial utility of many elastomers, especially the amorphous rubbers, would be severly limited. Encouraged by the filler [reinforcemnt] *reinforcement* response in cured rubbers, many attempts have been made to achieve similar effects in other polymers, especially in thermoplastics. These efforts have to date met with limited success and only for special filler/polymer combinations. In particular, the polyolefins have been notably unresponsive to reinforcement by particulate mineral fillers as would be expected from the unreactive chemical structure of polyolefins.

Early attempts at reinforcing polyethylene with carbon black resulted in stiff, brittle composites of little commercial value. However, it was found that by cross-linking a carbon black/polyethylene blend either by ionizing radiation or by a free radical initiator, such as peroxide, strong and tough thermoset composites could be made. See E. M. Dannenberg et al., Journal of Polymer Science, Volume 31, pages 127–153, 1958. Of course,, cross-linking removes many desirable attributes of the thermoplastic polyolefins such as the facility of using low-cost thermoplastic molding methods, the post-forming ability, such as vacuum and thermoforming, the ability to reprocess scrap and rejects, and more, all of which has limited the commercial usage of this discovery.

A second technically successful approach for reinforcing filled thermoplastic polymers has been developed more recently and is described in U.S. Pat. No. 4,187,210 (Howard, Jr.), issued Feb. 5, 1980. By this technique, an olefin polymerization catalyst is deposited on the filler surface after which the polymer is formed directly on each filler particle resulting in a filled polyolefin composite, which is exceptionally strong and tough. This method has proven useful in preparing filled composites from so-called ultra-high molecular weight (UHMW) polyethylene, i.e., polyethylene having such extreme melt viscosities that conventional melt processing such as injection molding, extrusion, melting, calendering, and the like, is not possible. In this case, incorporation of a filler by melt compounding is not possible and direct polymerization on the filler surface is thus the only feasible alternative. The resulting filled UHMW polyethylene powder may subsequently be formed by powder metallurgical processes such as pressure sintering the powder, e.g., into a billet, followed by forging, skiving, turning, etc. The properties attainable in such composites have been discussed by E. G. Howard et al., in a talk entitled "Ultrahigh Molecular Weight Polyethylene Composites: A New Dimension in Filled Plastics", recorded on pages 36–38 of the preprints of the October 1976 National Technical Conference of the Society of Plastic Engineers. However, for reasons of logistics and cost, it is commercially unattractive to use this technique for polyolefins in the more conventional molecular weight ranges which are capable of standard plastic processing. Hence, this technique has also found limited commercial usage.

A third attempt at reinforcing filled thermoplastics related to both of the above techniques was aimed at coating the filler particles with a layer of cross-linked polymer as described in U.S. Pat. No. 3,471,439 (Bixler et al.), issued Oct. 7, 1969. This was attempted by adsorbing a broad variety of unsaturated organic compounds onto the filler particles and then melt compounding the treated filer with a polymer and a free radical initiator, such as an organic peroxide, a percarbonate or an azo-compound. In contrast to the present invention, the patent discloses that the use of a free radical initiator is preferred and produces better results than in the absence of a free radical initiator. Furthermore, little distinction is made regarding the nature of possible coupling or decoupling effects of the individual filler treatments. This technique was subsequently replaced by an in-situ filler coating method with direct polymerization on the filler particles as described in U.S. Pat. No. 3,519,593 (Bolger), issued July 7, 1970. See also R. W. Hausslein and G. J. Fallick, Applied Polymer Symposia, No. 11, pages 119–134, 1969. None of these efforts proved commercially successful. In a similar vein, U.S. Pat. No. 3,956,230 (Gaylord), discloses the use of maleic anhydride plus a peroxide free radical initiator as a coupling agent system for polyolefins containing "hydroxyl containing fillers". The resulting composites were not fully characterized in terms of possible coupling or decoupling effects resulting from the use of the selected additives. Some treated filler composites showed improvements in ductility, i.e., elongation at break, and impact but no improvement in, or actual decreases in, the tensile strength. In other cases the reverse occurred and only in infrequent instances, such as Examples 2, 6, 16, 17 and 29, were increases reported for both ductility and strength.

The above techniques were further studied for kaolin-filled polyethylene by D. G. Hawthorne and D. H. Solomon, in "Reinforcement of Polyethylene by Surface-Modified Kaolins, " Journal of Macromolecular Science: Part A, Chemistry, Volume 8 (3), pages 659–671, 1974. The article lists the properties of various polyethylene composites containing 20–40 weight percent kaolin filler containing a variety of surface treatments, including some based on the teachings of U.S. Pat. No. 3,471,439 (Bixler et al.). Attempts were also made to develop more acceptable alternatives to these polymer-encapsulated fillers. The data show no significant increases in composite tensile strength, i.e., "breaking stress", in the cases of treated kaolins as compared to those either untreated or treated with nonreactive, i.e., "saturated", coatings. Also, at the 40 weight percent filler loading, only one sample, having a peroxy initiated pretreatment with a mixture of 2-methyl-5-vinyl-pyridine and diethylene glycol diacrylate, showed a significant increase in elongation at break of from 13 percent to 24 percent.

A recent Japanese patent, Japan Kokai No. 55–110, 138 (Tanaka et al.), which issued Aug. 25, 1980, describes the use of triacryloyl hexahydro-s-triazine in combination with free radical initiators in calcium carbonate filled polypropylene and high-density polyethylene, and in talc filled polypropylene. Small amounts of 1,2 polybutadiene were added in two experiments. In this procedure, the filler was first treated and heated with a mixture of the unsaturated compound and a free radical initiator, such as azo-bis-isobutyronitrile, and then melt compounded with the polymer, preferably with the further addition of more initiator, such as dicumyl peroxide. The injection molded specimens showed generally good increases in impact strength and low to moderate increases in tensile strength. No evaluations were reported without the addition of the free radical initiators.

There are many disadvantages associated with the use of peroxide initiated coupling systems in filled thermoplastics. Perhaps the principal one is that of stability. For example, pretreatment of the filler with the combination of a polymerizable monomer and a free radical initiator can cause pre-polymerization on heating or standing rendering the surface treatment ineffective at the time of compounding the promoter with the polymer. Even when satisfactory conditions for so-called integral blending have been established, i.e., when the filler treatment chemicals can be dispersed directly into the filler and the resin mixture at the time of melt compounding, the resulting compounds often have highly variable rheological properties during processing and highly variable mechanical properties after molding or extrusion. This difficulty in achieving reproducible results no doubt has contributed to the general lack of success of peroxide initiated coupling systems in commercial practice. Furthermore, the decomposition products of organic peroxides are notoriously [odiferous] *odoriferous* and confer a characteristic, undesirable smell to the final products similar to that well known from present peroxide cured polyolefin products. Finally, the use of peroxide additives adds to the cost and processing complexity in the manufacturing of filled polyolefin compounds.

Organic silanes are presently the most widely used coupling agents. These agents are used extensively as surface treatments for fiberglass where they serve a number of diverse functions such as protecting the glass fibers from water-induced stress corrosion, from mechanical damage in handling and processing, by improving the bonding of the fibers to various matrix polymers and by preserving the composite strength upon exposure to water. The state-of-the-art of silane treated mineral fillers in thermosetting and in thermoplastic polymers is outlined in a brochure F-43598A by Union Carbide Corporation published in February, 1979 and entitled, "Silane Coupling Agents in Mineral-Filled Composites." The principal commercial use to date of silanes in mineral-filled, non-crosslinked polyolefins is to maintain good electrical insulating properties after water exposure. The reinforcement promoting effect of most silanes in polyolefins is relatively modest for most mineral fillers. The high cost of silanes also detracts from their use with low-cost commodity mineral fillers.

The use of organic titanates as surface treatments for talc and calcium carbonate in polyolefins has been reviewed by C. D. Han et al., in Polymer Engineering and Science, Vol. 18, No. 11, pages 849–854, 1978. The titanates are reported to act as processing aids and to increase the toughness and the elongation at break of the composites. However, the tensile strength in the best cases is only slightly increased and in most cases it is actually reduced. Hence, referring to most titanates as coupling agents is a misnomer and the disclosed compounds do not belong to the class referred to here as reinforcement promoters.

Other materials such as fatty acids, i.e., stearic acid, fatty acid salts, such as zinc or calcium stearate, various detergents, oils and waxes are commonly employed as compounding ingredients or as pretreatments for mineral fillers in polyolefins. Generally, their effect is similar to that reported above for the titanates in that they facilitate filler dispersion and processing and often increase the elongation at break and sometimes the toughness. However, they do not improve the composite strength and often they even reduce the tensile properties relative to that of the filled polymer without the additive. The state-of-the-art of "hydrophobic" additives has recently been reviewed by D. E. Cope in reprint no. 24-E entitled, "Hydrophobic Filler Wetting—A New Technique for Improved Composite Performance and Production", from a talk presented at the 1979 Annual Technical Conference of the Reinforced Plastics/Composites Institute of the Society of the Plastics Industry. Another typical example of a recently developed organic filler treatment additive is described by de Souza et al. at pages 492–496 of the preprints from the 1979 Annual Technical Conference of the Society of Plastics Engineers, entitled "Low-Cost Highly Filled Impact Resistant Thermoplastics Composites". The article discloses that the tensile strength of a $CaCO_3$-filled polypropylene decreases rapidly with increasing concentration of the filler treatment additive. Hence, these types of filler treatment additives also are not reinforcement promoters as defined herein.

Certain organic compounds are effective coupling agents in specific filler/polyolefin composites. For example, 2,6-dimethylol 4-alkyl phenols dramatically increase the tensile strength of chrysotile asbestos/-polyolefin composites up until enough coupling agent is added corresponding to monomolecular coverage of the filler surface. See the article by F. H. Ancker et al., entitled "A Coated Asbestos with Better Coupling", Plastics Engineering, pages 32–36, July 1974. However, these organic compounds are rather specific to the brucite surface of chrysotile and they do not in general provide significant property improvements with particulate mineral fillers.

Certain simple organic chemicals, such as acrylic acid, have some reinforcement promoting effect in isolated filler/polyolefin composites such as aluminum trihydrate and $CaCO_3$-filled polyethylene. However, acrylic acid has a high vapor pressure and is quite noxious, both when used as a filler pretreatment or as an integral blend additive during hot melt compounding, and is has therefore not found wide-spread commercial use.

Chloroparaffins are effective coupling agents in mica-filled polypropylene as described in S. Newman and F. J. Meyer in "Mica Composites of Improved Strength", Polymer Composites, Volume 1, pages 37–43, September 1980. While these compounds are true coupling agents by the terms of this invention, they are not reinforcement promoters because they do not simultaneously improve tensile and impact strength. This was clearly recognized by the authors, at page 41 of the above article, who stated: "The impact behavior as measured by Izod impact values for the coupled systems are generally lowered and appear to be dominated by the reduced strain to yield and failure (ductility) of the matrix in the coupled systems. Moreover, this effect is seen to override the increased strength exhibited by these systems."

In summary, the state-of-the-art prior to the disclosure of the present invention is that most so-called coupling agents for filled thermoplastic polymers are not reinforcement promoters by the terms of this invention, i.e., they do not at the same time improve the strength and the ductility (elongation and toughness) of the filled polymer. In instances where some reinforcement promotion has occurred, it has been limited to the use of particular materials or processes which are either costly, inefficient or noxious in use; has been limited to highly select filler-polymer systems; has required the simultaneous use of free-radical generating additives with their associated problems of stability, odor generation, and the like; or has possessed a combination of these detracting features which have severely limited its commercial utility.

SUMMARY OF THE INVENTION

The present invention relates to a polymer composition, and process for producing such compositions, substantially free of a free radical initiator or its residue, which comprises a thermoplastic polymer and an inorganic filler, wherein the improvement comprises providing a reinforcement promoter which increases both the strength and ductility of the filled thermoplastic polymer. The reinforcement promoter has at least two reactive olefinic double bonds and is characterized by having a promoter index, P, which is greater than zero, and which is defined by the formula:

$$P = n(n-1)Q(e+2)(1-2R_f^s)-2.5$$

wherein n is the number of olefinic double bonds in the promoter, Q and e are the Alfrey-Price resonance and polarity parameters, respectively, of at least one of the olefinic double bonds in the promoter, and $R_f^s$ is the relative flow ratio of the promoter measured by thin layer chromatography on a neutral silica gel usly xylene as the eluant and di-n-butyl fumarate as the standard.

BRIEF DESCRIPTION OF THE DRAWING

The FIGURE is a diagram portraying the properties of an embodiment of the present invention, as compared with properties of embodiments as disclosed in the prior art.

DETAILED DESCRIPTION OF THE INVENTION

THERMOPLASTIC POLYMER

The invention relates to filled thermoplastic polymers whose strength and ductility properties are improved by the addition of certain reinforcement promoters. A preferred group of thermoplastics responsive to the reinforcement promoters of this invention are the normally solid hydrocarbon polymers comprising the polyalkenes, such as the polymers and copolymers of ethylene, propylene, butene, hexene, neohexene and 4-methyl pentene. These polymers may further contain residual unsaturation enabling subsequent curing or cross-linking as can be achieved, for example, by co- or terpolymerization with diene monomers such as norbornadiene. Included in the hydrocarbon polymers are the homo- and copolymers of dienes such as polybutadiene and polyisoprene, as well as the copolymers of butadiene and isoprene with styrene. Another preferred group of thermoplastics responsive to the reinforcement promoters of this invention is the group of hydrocarbon polymers containing low to moderate amounts (<18 weight percent) of polar comonomers such as vinyl acetate and ethyl acrylate. Also included among the responsive thermoplastic polymers are the polyamides and polyvinyl chlorides, including the copolymers of the latter with vinyl acetate.

Specifically preferred are the commercially available, normally solid, grades of HDPE (high-density polyethylene), PP (polypropylene), EPR and EPDM (ethylene/propylene rubbers), polyisoprene, polybutadiene and polybutadiene/styrene polymers. A most preferred thermoplastic polymer is high-density polyethylene having a density of about 0.94 to about 0.96 and a melt index of about 0.01 to about 20, preferably 0.05 to 10.

FILLER

The inorganic fillers that may be used in the compositions of the present invention are finely divided inorganic materials of natural or synthetic origin. The fillers may be particulates, platelets, fibers or fibrils, they may be regular or irregular in shape, and they may be amorphous or crystalline. Most of these fillers are generally considered to be "inert" when used in the preferred polymers of this invention, i.e., non-reinforcing in the sense that although they normally increase the stiffness (modulus) and often reduce the volume cost of a plastic composite, other properties such as strength and ductility are adversely affected, often to a severe degree. The reinforcement promoters of the present invention offset these negative effects by improving specifically the strength and ductility properties of such composites.

Illustrative of the natural silicates in Kaolinite, also known as China Clay, which may be used either in a natural ("hydrous") form or in a dehydrated ("calcined") form. Examples of other common clay minerals are feldspar, nepheline, montmorillonite, bentonite and attapulgite. Other typical natural silicates are talc, mica, wollastonite and asbestos. Various synthetic silicates are commonly used as fillers in elastomers such as, for example, precipitated calcium and aluminum silicates. Special silicates such as the natural and synthetic zeolites are sometimes used in polymer-bonded compositions where good mechanical properties are important for proper performance. Examples of expanded silicates are perlite and vermiculite. Illustrative of silica fillers are pyrogenic or fumed silica, precipitated or hydrated silica, vitreous or fused silica, and various natural silica fillers such as quartz, novaculite, tripoli and diatomite. Illustrative of carbonate mineral fillers are the natural calcite, dolomite, and limestone products (calcium and magnesium carbonates) which may be ground or provided in precipitated ("synthetic") forms. Illustrative of metal oxides and hydroxides are alumina, gibbsite, precipitated aluminum trihydrate, magnesium hydroxide, manganese oxides, titanium dioxide, various iron oxides and hydroxides, zinc oxide and zirconium oxide. Illustrative of ceramic fillers are barium titanate, barium ferrite and neodynium titantate. Illustrative of sulphate fillers are baryte and gypsum. Other illustrative fillers are fibers made from glass, basalt and other molten glasses, such as furnace slag. The average particle size of the filler is usually up to 100 μm, and preferably less than 30 μm.

REINFORCEMENT PROMOTER

The reinforcement promoters of the present invention are chemicals which have at least two reactive olefinic double bonds and which are further characterized by having a positive promoter index value, P, which is defined by the following equation:

$$P = n(n-1)Q(e+2)(1-2R_f^{\circ})-2.5 \qquad (A)$$

where n is the number of olefinic bonds in the promoter, Q and e are the Alfrey-Price parameters with regards to the resonance and polarity, respectively, for at least one of the olefinic double bonds in the promoter, and $R_f^{\circ}$ is the flow rate ratio of the promoter measured by thin layer chromatography on a neutral silica gel using xylene as the eluant and di-n-butyl fumarate as the standard. In Equation (A), the promoter index, P, has a value greater than zero, preferably greater than 2.0 and most preferably greater than 20. The promoter index formula illustrates the complex relation between the four critical parameters which contribute to the exceptional performance of the class of reinforcing promoters utilized in the present invention.

Of the four parameters in Equation (A) which determine the promoter index, n is the number of reactive olefinic double bonds in the structure of the reinforcing promoter. The term "reactive" covers those double bonds which exhibit Q and e-values which satisfy Equation (A) to provide a positive reinforcement promotion index. It is preferred that n be at least three although in special cases where the other parameters are particularly favorable, n may be as low as two. Equation (A) reflects the experimental finding, with all other factors being equal, that the reinforcement performance varies strongly with n when n is at least two. The form of the n-term reflects the importance of localized network, i.e., bound polymer, formation near the surface of the filler particle as is discussed in the mechanism section below.

The next two parameters in Equation (A), Q and e, are commonly used for characterizing the resonance and the polarity effects, respectively, for monomers used in copolymerization. A detailed description of the Q and e concepts is presented by T. Alfrey, Jr. and L. J. Young in Copolymerization at Chapter 2, pages 67 to 87, 1964, and in the references listed at the end of the chapter. At extensive tabulation of Q and e-values for monomers is given by L. J. Young at pages II-387 to II-404 in the second edition of Polymer Handbook, edited by J. Brandrup and E. H. Immergut, Interscience, (New York) 1975. The promoters defined by Equation (A) cannot in general be found in such tables, however, Q and e-values for potential reinforcement promoters may be estimated from the values of monomers having closely similar olefinic double bond structures. Where the Q and e-values have not been tabulated for any closely similar structures, the values can be determined experimentally using the procedures set forth in the Brandrup and Immergut handbook and the references cited therein. The Q and e terms in Equation (A) reflect the experimental finding that Q values should preferably be high, most preferably greater than or equal to 0.4, and that, in general, positive e-values are preferred, and most preferably have a value of at least 1.0.

The final parameter in Equation (A) of the relative flow ratio, $R_f^\circ$, is a measure of the adsorptivity of a potential reinforcement promoter onto highly polar mineral surfaces. Many interactions between organic chemicals and solid surfaces are highly specific, in that one mineral may result in chemical bonding whereas another mineral may result in adsorption through dipole/dipole interactions. However, for the purpose of the present invention, the requirement of adsorptivity is for convenience expressed in terms of the relative flow ratio of the promoter measured by thin layer chromatography on a neutral silica gel using xylene as the eluant and di-n-butyl fumarate as the standard. The silica gel is a convenient representation of a filter (silica) in a hydrocarbon polymer (xylene). Xylene is preferred over the simple aliphatic hydrocarbons because it is a better solvent for polar compounds and the compounds must be dissolved in order to perform the chromatographic adsorptivity test. The $R_f^\circ$ term assures that the potential reinforcement promoter molecule will adsorb sufficiently onto the filler surface so as to effectively contribute to the morphological change required in the polymer layer immediately adjacent to the filler particle. The relative flow ratio, $R_f^\circ$, which is used as the chromatographic adsorption parameter, is defined as the ratio of advancement of the dissolved chemical relative to the advancement of the solvent front in a conventional thin-layer chromatography test such that the greater the adsorptivity of the chemical, the lower the flow ratio. The $R_f^\circ$ parameter used in Equation (A) is defined as the ratio of the flow ratio for the chemical being tested, $R_f$, relative to the flow ratio of a standard compound, $R_{fs}$, as follows:

$$R_f^\circ = (R_f/R_{fs}) \quad \text{(B)}$$

The standard selected for purposes of the present invention is di-n-butyl fumarate. Background concerning chromatographic techniques and concepts is provided by L. R. Synder, in Principles of Adsorption Chromatography, Marcel Dekker Inc., (New York), 1968. A specific reference to thin layer plate techniques using particulate material coatings on glass plates is presented by J. G. Kirchner, J. N. Miller, and G. J. Keller, in Analytical Chemistry, Volume 23, at pages 420–425, March 1951.

The $R_f^\circ$ terms in Equation (A) requires that the adsorptivity of an effective reinforcement promoter must be appreciably greater than that of di-n-butyl fumarate under the stated conditions. This is evident since for P to remain positive the algebraic requirement is for $R_f^\circ$ to be less than 0.5. The $R_f^\circ$ term in Equation (A) should therefore be as small as possible, preferably less than 0.05, and most preferably no more than 0.01. It is not critical, although often desirable, that a reinforcement promoter have a specific or chemical bonding interaction with the filler surface in a given filled polymer composition.

Equation (A) is a statement of the findings that the four critical parameters of n, Q, e, and $R_f^\circ$ must simultaneously be within certain ranges of values, and that some relaxation in the requirement for one or more parameters is allowable only if one or more of the other parameters assume particularly favorable values. The following tables give the values for the four critical parameters for various chemicals which either satisfy Equation (A) (Table I chemicals), other chemicals containing olefinic double bonds which fail to satisfy Equation (A) (Table II chemicals), or chemicals which do not contain the reactive double bonds, some of which are disclosed in the prior art as being used as dispersing and processing aids in mineral-filled polymers (Table III chemicals). The latter chemicals generally fall into the categories of lubricants and plasticizers depending on their adsorptivity.

TABLE I

| Chemical | Designation | Carbon-carbon double bonds, n | Resonance, Q | Polarity, e | Relative flow ratio, $R^\circ_f$ | Promoter index, P |
|---|---|---|---|---|---|---|
| Trimethylolpropane triacrylate | TTA | 3 | 0.4 | 1.0 | 0.12 | 3.0 |
| Pentaerythritol triacrylate | PETA | 3 | 0.4 | 1.0 | 0.05 | 4.0 |
| Polycaprolactone triacrylate | PCLTA | 3 | 0.4 | 1.0 | 0.01 | 4.6 |
| m-Phenylene bis maleimide | PBM | 2 | 3.0 | 1.6 | 0.06 | 16.5 |
| Dipentaerythritol pentaacrylate | DPEPA | 5 | 0.4 | 1.0 | 0.04 | 19.6 |
| Melamine triacrylate | MTA | 3 | 1.3 | 1.2 | 0.02 | 21.5 |
| Epoxidized linseed oil/acrylate | ELA | 5 | 0.4 | 1.0 | 0.01 | 21.0 |
| Triacryloyl hexahydro-s-triazine | TAHT | 3 | 1.3 | 1.2 | 0.01 | 22.0 |
| Maleamic acid derivatives of methylene-aniline oligomers* | MADMA | 3 | 1.2 | 1.5 | 0.01 | 22.2 |
| Trimethylolpropane trimaleate | TTM | 3 | 1.2 | 1.5 | 0.01 | 22.2 |
| Trimethacryloyl hexahydro-s-triazine | TMHT | 3 | 1.5 | 1.2 | 0.01 | 25.7 |
| N,N—Tetraacryloyl 1,6-diaminopyridine | TADAP | 4 | 1.3 | 1.2 | 0.01 | 46.4 |

*Methylene-aniline oligomers fall under the tradename "Jeffamine" as produced by the Jefferson Chemical Company.

TABLE II

| Chemical | Designation | Carbon-carbon double bonds, n | Resonance Q | Polarity, e | Relative flow ratio, $R^\circ_f$ | Promoter index, P |
|---|---|---|---|---|---|---|
| Diethylene glycol diacrylate | DGDA | 2 | 0.4 | 1.0 | 0.01 | −0.1 |
| Ester diol 2,4-diacrylate | EDDA | 2 | 0.4 | 1.0 | 0.03 | −0.2 |
| 1,4 butylene glycol diacrylate | BGDA | 2 | 0.4 | 1.0 | 0.21 | −1.1 |
| Diethylene glycol dimethacrylate | DGDMA | 2 | 0.7 | 0.4 | 0.31 | −1.2 |
| 1,3 butylene glycol dimethacrylate | BGDM | 2 | 0.7 | 0.4 | 0.35 | −1.5 |

TABLE II-continued

| Chemical | Designation | Carbon-carbon double bonds, n | Resonance Q | Polarity, e | Relative flow ratio, $R^*_f$ | Promoter index, P |
|---|---|---|---|---|---|---|
| Triallyl cyanurate | TAC | 3 | 0.02 | −1.0 | 0.01 | −2.4 |
| Triallyl-s-triazine-2,4,6-(1H, 3H, 5H)trione | TATZTO | 3 | 0.02 | −1.0 | 0.01 | −2.4 |
| Triallyl mellitoate | TAM | 3 | 0.02 | −1.0 | 0.01 | −2.4 |
| Glycerol monoacrylate | GMA | 1 | 0.4 | 1.0 | 0.01 | −2.5 |
| Abietic acid | ABA | 1 | 2.4 | −1.2 | 0.02 | −2.5 |
| Maleic anhydride | MAH | 1 | 0.2 | 2.2 | 0.02 | −2.5 |
| Acrylamide | AAM | 1 | 1.3 | 1.2 | 0.03 | −2.5 |
| Oleic acid | OA | 1 | 0.01 | −1.5 | 0.06 | −2.5 |
| Sorbic acid | SA | 1 | 2.0 | −1.0 | 0.06 | −2.5 |
| Hydroxy methyl norbornene | HMNB | 1 | 0.01 | −1.0 | 0.29 | −2.5 |
| Di n-butyl maleate | DNBM | 1 | 1.2 | 1.5 | 0.43 | −2.5 |
| Linalool | LLO | 2 | 0.01 | −0.6 | 0.49 | −2.5 |
| Di n-butyl fumarate | DNBF | 1 | 1.2 | 1.5 | 1.00 | −2.5 |
| Dicyclopentadiene | DCPD | 2 | 0.02 | −0.5 | 2.80 | −2.8 |
| Squalene | SQ | 6 | 0.01 | −1.6 | 2.79 | −3.0 |

TABLE III

| Compound | Designation | Carbon-carbon double bonds, n | Resonance Q | Polarity, e | Relative flow ratio, $R^*_f$ | Promoter index, P |
|---|---|---|---|---|---|---|
| Polyethylene glycol | PEG | 0 | 0 | 0 | 0.005 | −2.5 |
| n-Propyl acid phosphate | PAP | 0 | 0 | 0 | 0.02 | −2.5 |
| Isopropyl tri-isostearyl titanate | ITIT | 0 | 0 | 0 | 0.02 | −2.5 |
| 2-Ethyl hexyl phosphate | EHP | 0 | 0 | 0 | 0.03 | −2.5 |
| Stearic acid | STA | 0 | 0 | 0 | 0.06 | −2.5 |
| Polydimethyl siloxane | PDMS | 0 | 0 | 0 | 0.24 | −2.5 |
| Pentane dione | PD | 0 | 0 | 0 | 0.63 | −2.5 |
| Stearyl acetate | STAC | 0 | 0 | 0 | 1.40 | −2.5 |
| Paraffin oil | PO | 0 | 0 | 0 | 2.80 | −2.5 |
| Trimethylolpropane tripropionate | TTP | 0 | 0 | 0 | 0.14 | −2.5 |
| Isostearic acid | ISTA | 0 | 0 | 0 | 0.08 | −2.5 |
| Calcium stearate | CSTA | 0 | 0 | 0 | 0.00 | −2.5 |

As is demonstrated in the examples appearing below, the reactive chemicals listed in Table I are greatly superior to those listed in Table II and to the nonreactive interfacial agents listed in Table III. The chemicals in Table I are reinforcement promoters which satisfy Equation (A), which do not require the addition of peroxides or other free radical initiators, and which are more cost-effective in use than presently used interfacial agents.

In some instances it is possible or even preferable to carry out the synthesis of certain reinforcement promoters directly on a filler surface as illustrated in Example 12 below. It is therefore within the spirit and intent of the present invention that the definition of reinforcement promoters applies to those chemicals as they actually occur on the filler surfaces, even though the individual reagents may not satisfy the requirements under Equation (A).

Preferred reinforcement promoters include those chemicals having the following structure:

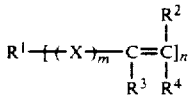

(C)

wherein $R^1$ is an organic group free of olefinic or acetylenic unsaturation having a valence of n; $R^2$, $R^3$ and $R^4$ are hydrogen, carboxy or monovalent organic groups free of olefinic or acetylenic unsaturation; X is:

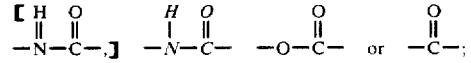

m has a value of 0 or 1; and n has a value of at least two, and preferably from 3 to 5. When m is zero, $R^1$ preferably has a double or triple bond which is conjugated with the olefinic double bond, and which is electron withdrawing. When m is one, X preferably has a similar conjugated double or triple bond structure providing an electron withdrawing effect on the olefinic double bond. Illustrative of the group represented by $R^1$ are heterocyclic groups consisting of carbon, hydrogen and nitrogen, e.g., s-triazine and diaminopyridine where the free valences are on nitrogen; polyvalent hydrocabon groups, such as alkylene, phenylene, or a group derived from polyhydroxy alkanes by the removal of the hydroxyl groups, such as contained in the condensation products of acrylic and maleamic acids with aliphatic, aromatic or heterocyclic polyols; or acrylamides, maleimides and maleamic acids of aliphatic, aromatic and heterocyclic polyamines. Particularly preferred reinforcement promoter compounds are those compounds listed in Table I, some of which are identified by the structures in Table IV below:

TABLE IV

| Designation | m | n | $R^1$ | $R^2$ | $R^3$ | $R^4$ | X |
|---|---|---|---|---|---|---|---|
| TTA | 1 | 3 | $CH_3CH_2C(CH_2)_3$ | H | H | H | $-O-\overset{O}{\overset{\|}{C}}-$ |

TABLE IV-continued

| Designation | m | n | $R^1$ | $R^2$ | $R^3$ | $R^4$ | X |
|---|---|---|---|---|---|---|---|
| PETA | 1 | 3 | $(CH_2)_3C-CH_2OH$ | H | H | H | $-O-\overset{O}{\overset{\|\|}{C}}-$ |
| DPEPA | 1 | 5 | $HO-CH_2-C(CH_2)_2-CH_2-O-CH_2-C(CH_2)_2-CH_2-$ | H | H | H | $-O-\overset{O}{\overset{\|\|}{C}}-$ |
| MTA | 1 | 3 | 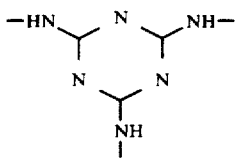 | H | H | H | $-O-\overset{O}{\overset{\|\|}{C}}-$ |
| TAHT | 1 | 3 | 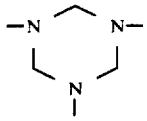 | H | H | H | $-\overset{O}{\overset{\|\|}{C}}-$ |
| MADMA | 1 | 2 + x | 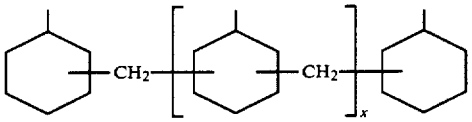 | H | H | COOH | $-\overset{H}{\overset{\|}{N}}-\overset{O}{\overset{\|\|}{C}}-$ |
| TTM | 1 | 3 | $CH_3CH_2C(CH_2)_3$ | H | H | COOH | $-O-\overset{O}{\overset{\|\|}{C}}-$ |
| TMHT | 1 | 3 | 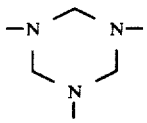 | $CH_3$ | H | H | $-\overset{O}{\overset{\|\|}{C}}-$ |
| TADAP | 1 | 4 | 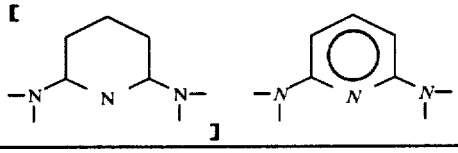 | H | H | H | $-\overset{O}{\overset{\|\|}{C}}-$ |

The most preferred compounds are ELA, TAHT, MTA, and TADAP.

The proportions of the three components in the reinforced filled thermoplastic polymer of the present invention are from about 0.1 to 5.0 weight percent, preferably about 0.5 to 2.0 weight percent, of the reinforcement promotor; about 10 to 90 weight percent, preferably about 10 to 60 weight percent, of the inorganic filler; and about 10 to 90 weight percent, preferably about 40 to 90 weight percent, of the thermoplastic polymer. These percentages are based on the total amount of promoter, filler and polymer in the composition.

ADJUVANTS

Adjuvants which may be employed in the compositions of the present invention include curing agents; flame retardant additives; blowing agents; nucleating agents for blown systems; lubricants; UV stabilizers; dyes and colorants; voltage stabilizers; metal deactivators; and traditional coupling agents. These adjuvants would be used in amounts designed to provide the intended effect in the resulting composition. The total amount of adjuvants would usually range from 0 to about 60 weight percent based on the total weight of the reinforced, filled thermoplastic composition. Where the adjuvants are compounds which may interfere with a performance of the reinforcement promoter, they should be added subsequent to the formation of the reinforced, filled thermoplastic composition. If there is no significant interaction to inhibit the performance of the reinforcement promoter, the adjuvants may be added at any time based on the established procedures of the prior art.

FREE RADICAL INITIATOR ABSENCE

To overcome the problems involving the presence of a free radical initiator or similar type of chemical which would inhibit the effectiveness of the reinforcement promoter, the composition should be substantially free of such chemicals or their residue to the extent that the presence of such chemicals would significantly interfere with the effectiveness of the reinforcement promoter. Similarly, in conducting the process of the invention, the admixing and compounding of the composition is conducted in the substantial absence of free radical initiators or related chemicals to the extent that the presence of such chemicals would significantly interfere with the effectiveness of the reinforcement promoter. In quantitative terms, the composition should generally contain less than 0.01 weight percent of free radical initiator or its residue with respect to the weight amount of reinforcement promoter provided, and preferably no more than 0.005 weight percent.

PROCESS

In an embodiment of the process of the present invention, the reinforcement promoters may be admixed with the filler by stirring the promoter with the filler using a solution containing a solvent which is allowed to evaporate before compounding the filler into the thermoplastic polymer. This is done to assure uniformity of distribution for the various reinforcement promoters onto the fillers since the chemicals vary greatly in physical form, i.e., liquid vs. solid, in viscosity, melting point and the like. In practice, less expensive methods are preferred. These methods would include the reinforcement promoter being used as a filler pretreatment, e.g., from an aqueous dispersion by spray-tumbling in a ribbon blender; by mechanically mixing the promoter at high shear as a liquid or solid which is predispersed or dissolved in other compounding ingredients, if any; by direct addition of the promoter to the filled thermoplastic resin prior to compounding; or as a concentrate in the polymer.

The filler and reinforcement promoter may be dispersed in the polymer by processes such as banburying, milling, extrusion-including twin screw extrusion and the like. The reaction of the reinforcement promoter with the filler and the matrix polymer is believed to require polymer free radical formation by the mechanochemical rupture of polymer chains, hence a minimum intensity of compounding and a minimum length of time is required to achieve the reinforcement promoter effect. As will be appreciated by those skilled in the art, those threshold conditions depend not only on the particular reinforcement promoter but also on the actual equipment used, the operating temperatures, the rheological properties of the polymer, the lubricity of the compound as influenced by various additives and adjuvants, etc. Hence, at the current state of the art it is not possible to specify this threshold of compounding intensity and time, yet for the purpose of this invention the conditions corresponding to good compounding practice is generally sufficient. In any event, reasonable experimentation by one skilled in the art would be sufficient for determining when sufficient compounding has been achieved.

It is desired for reasons of efficiency and cost to use thermoplastic polymers with little or no antioxidant added prior to compounding with the filler. The reason is that antioxidants (AH) compete with the reinforcement promoter for the free radicals formed on the polymer chains ($\sim R^{\circ}$) during melt compounding usually by hydrogen transfer to the polymer radical as follows:

$$\sim R^{\circ} + AH \rightarrow \sim RH + A^{\circ} \qquad (D)$$

As a result, the polymer radical site is terminated while being replaced with a stable antioxidant radical, $A^{\circ}$ which itself is incapable of forming new polymer radicals by hydrogen abstraction from the polymer. In cases where a commercial thermoplastic polymer already contains significant amounts of antioxidant additives, it may be desirable to reduce this effect by shearing the polymer briefly by itself to pre-react most of the antioxidant molecules with polymer radicals formed by shear or oxidation. This will usually alleviate the inhibiting effect of the antioxidant on the reinforcement promoter reaction with the polymer. Nevertheless, a preferred route is to use thermoplastic polymers with little or no antioxidant added, by melt compounding the filler and reinforcement promoter under intensive shear, and lastly, if required, add additional antioxidant. In a batch compounding operation such as banburying or milling, this is done by a proper sequencing of the compound ingredient addition. In continuous compounding, utilizing twin screw extruders or similar devices, the sequencing is most conveniently done by introducing the ingredients at suitable feedport locations in the extruder.

The reinforced, filled thermoplastic polymers of the present invention may be utilized in any application for which increased strength and utility would be valuable for the filled thermoplastic polymer such as molded parts, extruded film and sheet, pipe and profiles, calendered film and sheet as well as thermoformed parts and blow-molded or rotationally cast hollow parts. Other applications include adhesives and sealants having improved strength and stiffness.

MECHANISM

Without wishing to be bound to any particular theory or mechanism, it is believed that the reinforcement promoters of the present invention react chemically with the thermoplastic polymer matrix during the hot melt compounding of the filled thermoplastic polymer, which may include extrusion, milling or other hot melt processing. It is believed further that the reinforcement promoter reaction with the polymer causes the formation of a strong and tough interphase between the individual filler particles and the surrounding matrix polymer, enabling this layer to withstand the local stress concentrations caused by the filler particles which would otherwise result in matrix crack initiation and catastrophic failure. It is believed that such increases in the toughness of the interphase enables the simultaneous achievement of high strength and ductility in the final composite. Filler treatments which rely solely on increased adhesion, i.e., coupling, between the filler surface and the matrix polymer, can increase the composite strength but if there is no improvement in interphase toughness, the composite will remain brittle. On the other hand, filler treatments which reduce the bonding between the filler particle and the matrix polymer, e.g., by introducing a weak interphase, can reduce the tendency for crack initiation by a mechanism of microavitation which reduces both the actual strain of the polymer matrix and the local matrix tensile stress near the filler particle, and may therefore result in marked improvements in composite ductility. However, a decreased level of adhesion, i.e., decoupling, will reduce the load-bearing contribution by the filler particles and hence often [causes] *cause* a concomitant reduction in the strength of the composite. In summary, the effect of the reinforcement promoter of the present invention may not merely be to increase the adhesion between the filler particles and the thermoplastic polymer matrix, nor may it be that the promoter is solely a "graded seal", i.e., an interphase layer having a modulus intermediate between that of the filler and the polymer. In contrast, it may be that the desired effect is a much more complex morphological change in the polymer interphase layer which must become both stronger and tougher than the original matrix polymer while at the same time exhibit adhesion both to the polar surface of the filler particles and to the relatively unmodified, non-polar bulk thermoplastic polymer matrix phase.

There are certain similarities between the behavior of carbon black and silica in many elastomers and the behavior of mineral fillers in polyolefins in the presence of the reinforcement promoters of the present invention. For a review of filler reinforcement phenomena in elastomers, see G. Kraus (editor), Reinforcement of Elastomers, New York, 1965 (Interscience), particularly Chapter 8 by W. F. Watson entitled "Chemical Interactions of Fillers and Rubbers During Cold Milling". It has been long known that both cold and hot milling of carbon or silica filled rubbers lead to the formation of so-called "bound rubber", such that even in the uncured state, the filler becomes irreversibly bound to a portion of the rubber which swells but does no longer dissolve in a typical rubber solvent. Although the detailed relationship between the formation of "bound rubber" and the extraordinary reinforcement effect of carbon black and silica in rubber is still not fully understood, there is a general agreement that the two phenomena are related. Such "bound" polymer has been observed on the filler after solvent extraction of polyolefins milled with mineral fillers in the presence of the reinforcement promoters of the present invention, suggesting that the utilization of the reinforcement promoters which satisfy the Equation (A) may enable a unique achievement in the reinforcement of general purpose, thermoplastic polyolefins with heretofore non-reinforcing mineral fillers.

EXAMPLES

The following examples illustrate the effect of the reinforcement promoters of the present invention, as compared with various control chemicals. Unless otherwise indicated, the procedure for making the treated, filled thermoplastic polymer compositions was as follows.

The filler pretreatment procedure consisted of dissolving about 10 g of reinforcement promoter in enouth solvent, e.g., acetone, to dissolve the promoter, but less than the amount of solvent which would produce a paste with the wetted filler. The promoter solution was then added to 500 g of filler, blended mechanically and air dried overnight.

The pretreated filler was compounded with 250 g of thermoplastic polymer on a 6" by 12" 2-roll mill at 180° C. by adding 250 g of pretreated filler incrementally to the fluxed polymer. Mixing was continued using thorough compounding procedures. A sheet of the treated, filled polymer was then cut and rolled into a cylindrical bar, i.e., "pig", and then passed end-wise through the compounding mill about ten times for a total mixing time [for] *of* ten minutes after all the filler [has] *had* been added. The product composition was then sheeted off the mill, allowed to cool to room temperature and granulated in a granulator.

The following testing procedures were used for each product composition. The granulated product composition was injection molded at a melt temperature of 215° C. using a 38 $cm^3$ capacity, 30 ton reciprocating screw-injection machine with a mold providing an ASTM dog bone test bar with dimensions of 2" by ½" by ⅛" for testing tensile properties, and a rectangular bar with dimensions of 5" by ½" by ⅛" for testing flexural properties. The following tests were used for each product composite:

| Property Tested | ASTM Test Designation |
|---|---|
| Tensile Strength<br>Tensile Modulus<br>Elongation at Yield<br>Elongation at Break | D638-76 |
| Flexural Strength<br>Flexural Modulus | D790-71 |
| Izod Impact Strength | D256-73 |
| Heat Distortion Temperature | D648-72 |

During the tension and flexural tests a cross-head speed of 0.2" per minute was utilized.

The chemical designations used in the examples are defined as follows:

| Designation | Description |
|---|---|
| AAM | Acrylamide |
| ABA | Abietic acid |
| ATH | Aluminum trihydrate having an average particle size of 0.3 to 1.0 μm and a surface area of about 6 to 15 $m^2g$. |
| $CaCO_3$ I | Calcium carbonate consisting of a finely ground limestone having 93 to 96 percent calcium carbonate in the form of a calcite having an average particle size of 3.5 μm. |
| Clay I | An unmodified hard clay consisting of a hydrated kaolin with a mean particle size of 0.3 μm and a B.E.T. surface area of 20 to 24 $m^2g$. |
| CSTA | Calcium stearate |
| DGDA | Diethylene glycol diacrylate |
| HDPE I | A high-density polyethylene having a density of 0.959 g/cc and a melt index of 0.7. |
| HDPE II | A high-density polyethylene having a density of 0.948 g/cc and a melt index of 0.15. |
| GMA | Glycerol monoacrylate |
| ISTA | Isostearic acid |
| ITIT | Isopropyl tri-isostearyl titanate |
| MADMA | Maleamic acid derivatives of methylene-aniline oligomers |
| MAH | Maleic anhydride |
| MTA | Melamine triacrylate |
| PCLTA | Polycaprolactone triacrylate |
| PEG | Polyethylene glycol |
| PETA | Pentaerythritol triacrylate |
| PP I | A pre-stabilized polypropylene homopolymer having a density of 0.905 and a melt flow of 5.0. |
| PP II | An unstabilized polypropylene homopolymer having a density of 0.905 g/cc and a melt flow of 2.0. |
| TAC | Triallyl cyanurate |
| TADAP | N,N—Tetraacryloyl 1,6-diaminopyridine |
| TAHT | Triacryloyl hexahydro-s-triazine |
| Talc I | A natural, asbestos free, magnesium silicate containing 98 percent talc with a |

-continued

| Designation | Description |
|---|---|
| | mean particle size of 1.5 μm and a B.E.T. surface area of 17 $m^2/g$. |
| TAM | Triallyl mellitoate |
| TATZTO | Triallyl-s-triazine-2,4,6-(1H,3H,5H) trione |
| TETA | Triethylene tetramine |
| TTA | Trimethylolpropane triacrylate |
| TTM | Trimethylolpropane trimaleate |
| TTP | Trimethylolpropane tripropionate |

EXAMPLE 1

Treated, filled thermoplastic polymer composition containing about 50 weight percent HDPE I, as thermoplastic polymer, about 49 weight percent ATH as filler and about 1.0 weight percent reinforcement promoter, or other control treating chemical, were prepared and tested using the procedures described above. The ATH filler was pretreated with the chemicals listed in Table 1 with the following results.

TABLE 1

| | | (ATH/HDPE I) | | | |
|---|---|---|---|---|---|
| Treating Agent Type (Table I, II or III) | Treating Agent | Tensile Strength (psi) | Tensile Modulus (ksi) | Elongation at Break (%) | Izod Impact Strength (ft-lbs/in.) |
| — | None | 3,416 | 269 | 4.4 | 1.7 |
| I | TTA | 5,606 | 338 | 16.3 | 2.2 |
| I | TTM | 5,080 | 336 | 15.8 | 2.7 |
| I | PETA | 5,180 | 311 | 35.0 | 5.7 |
| II | DGDA | 3,710 | 247 | 12.6 | 1.5 |
| II | GMA | 3,610 | 247 | 10.0 | 1.4 |
| II | AAM | 3,710 | 276 | 8.1 | 0.9 |
| III | ITIT | 2,930 | 180 | 27.0 | 0.8 |
| III | PEG | 3,300 | 217 | 6.8 | 2.6 |
| III | TTP | 3,300 | 243 | 6.5 | 2.3 |

The samples treated with reinforcement promoter compounds listed in Table I show an increase in tensile strength of 50–65 percent; a noticeable increase in stiffness; a four to eight fold increase in elongation; as well as a 30 to 330 percent increase in Izod impact strength. In contrast, the chemicals selected from Table II produce only very minor improvements in tensile strength, with little or no increases in tensile modulus some increases in elongation and actual decreases in Izod impact strength. The Table III chemicals significantly reduce both tensile strength and modulus while obtaining improvements in elongation or Izod impact strength.

EXAMPLE 2

The following samples were prepared and tested using the same procedures as in Example 1 except that $CaCO_3$I was used as filler in place of the ATH in Example 1.

TABLE 2

| | | ($CaCO_3$ I/HDPE I) | | | |
|---|---|---|---|---|---|
| Treating Agent Type (Table I, II or III) | Treating Agent | Tensile Strength (psi) | Tensile Modulus (ksi) | Elongation at Break (%) | Izod Impact Strength (ft-lbs/in.) |
| — | None | 2,900 | 215–248 | 23–63 | 0.5 |
| I | TTA | 5,420 | 296 | 25 | 1.9 |
| II | AAM | 3,070 | 254 | 25 | 0.6 |
| III | ITIT | 2,040 | 150 | 33 | 1.7 |

The results illustrate, for a $CaCO_3$/HDPE filled polymer, that the reinforcement promoter performance is important in simultaneously increasing both tensile and impact strength.

EXAMPLE 3

The following samples were prepared and tested as described in Example 1 except that the Clay I was used as the filler in place of the ATH in Example 1.

TABLE 3

| | | (Clay I/HDPE I) | | | |
|---|---|---|---|---|---|
| Treating Agent Type (Table A, II or III) | Treating Agent | Tensile Strength (psi) | Tensile Modulus (ksi) | Elongation at Break (%) | Izod Impact Strength (ft-lbs/in.) |
| — | None | 3,610 | 256 | 3.5 | 0.6 |
| I | TTA | 5,080 | 372 | 10.6 | 1.8 |
| I | PCLTA | 4,600 | 358 | 10.0 | 1.9 |
| II | MAH | 3,970 | 293 | 4.4 | 0.6 |
| III | ISTA | 3,520 | 281 | 3.2 | 1.1 |

The results show that for a Clay I/HDPE I filled polymer, the n-value in the structural formula is important for reinforcement promoter performance.

EXAMPLE 4

Additional ATH-filled HDPE composites were prepared and tested as in Example 1, with the following results.

TABLE 4

| | | (ATH/HDPE I) | | | |
|---|---|---|---|---|---|
| Treating Agent Type (Table I, II or III) | Treating agent | Tensile Strength (psi) | Tensile Modulus (ksi) | Elongation at Break (%) | Izod Impact Strength (ft-lbs/in.) |
| — | None | 3,416 | 269 | 4.4 | 1.7 |
| I | TAHT | 4,340 | 290 | 66.0 | 4.5 |
| I | PBM | 5,140 | 314 | 46.0 | 4.6 |
| II | TAC | 3,810 | 251 | 3.4 | 1.6 |
| II | TAM | 3,760 | 221 | 5.2 | N/A* |
| III | CSTA | 3,340 | 286 | 68.0 | 2.9 |

*N/A — data not available

These results, along with the data in Tables I, II and III for Q, e and n-values, show that the presence of more than one ethylene unsaturation in itself is not sufficient to establish effective reinforcement promoter performance. Instead, both the Q and e-values should be sufficiently favorable to satisfy the requirement for having a positive promoter index value. These samples show that high Q-values and positive e-values are important for simultaneously achieving high tensile properties as well as high elongation and impact properties.

EXAMPLE 5

The following treated $CaCO_3$ I/HDPE I samples were prepared and tested as were the samples in Example 2.

TABLE 5

| Treating Agent Type (Table I, II or III) | Treating Agent | Tensile Strength (psi) | Tensile Modulus (ksi) | Elongation at Break (%) | Izod Impact Strength (ft-lbs/in.) |
|---|---|---|---|---|---|
| | | ($CaCO_3$ I/HDPE I) | | | |
| — | None | 2,900 | 215-248 | 23-63 | 0.5 |
| I | TAHT | 4,330 | 265 | 23 | 2.5 |
| I | PBM | 4,570 | 275 | 65 | 2.6 |
| I | MADMA | 4,290 | 279 | 88 | 2.4 |
| II | TAC | 3,900 | 252 | 22 | 0.7 |

These samples for treated $CaCO_3$ I/HDPE I filled polymers show that, as with the treated ATH/HDPE filled polymers in Example 4, multiple ethylenic unsaturation alone in chemicals such as TAC without favorable Q and e-values is insufficient to provide effective reinforcement promotion when compared with the properties of filled polymers treated with chemicals like those listed in Table I.

EXAMPLE 6

The following Clay I-filled HDPE I compositions were prepared and tested as in EXAMPLE 3.

TABLE 6

| Treating Agent Type (Table I, II or III) | Treating Agent | Tensile Strength (psi) | Tensile Modulus (ksi) | Elongation at Break (%) | Izod Impact Strength (ft-lbs/in.) |
|---|---|---|---|---|---|
| | | (Clay I/HDPE I) | | | |
| — | None | 3,610 | 256 | 3.5 | 0.6 |
| I | TADAP | 4,650 | 375 | 9.4 | 1.6 |
| I | TAHT | 5,060 | 340 | 28.0 | 3.6 |
| II | TATZTO | 4,050 | 336 | 3.6 | 0.6 |

The results show, as with Examples 4 and 5, that favorable Q and e-values are necessary as well in clay filled HDPE composition to attain superior reinforcement promoter performance.

EXAMPLE 7

The following treated, ATH-filled polypropylene compositions were prepared and tested as in EXAMPLE 1. In the first three samples a conventional antioxidant stabilized polypropylene, designated PP I, was utilized. In the last four samples an antioxidant-free polypropylene, designated PP II, was utilized.

TABLE 7

| Treating Agent Type (Table I, II or III) | Treating Agent | Tensile Strength (psi) | Tensile Modulus (ksi) | Elongation at Break (%) | Izod Impact Strength (ft-lbs/in.) |
|---|---|---|---|---|---|
| | | (ATH/PP) | | | |
| | | Part A - With Antioxidant, PP I | | | |
| — | None | 3,330 | 325 | 2.2 | 0.3 |
| I | TTA | 3,530 | 316 | 1.4 | 0.5 |
| I | PETA | 3,330 | 260 | 2.7 | 0.5 |
| | | Part B - Without Antioxidant, PP II | | | |
| — | None | 3,770 | 337 | 1.5 | 0.3 |
| I | TTA | 5,150 | 357 | 6.2 | 0.8 |
| I | PETA | 5,050 | 365 | 10.0 | 0.9 |
| II | DGDA | 3,800 | 344 | 2.5 | 0.4 |

The results show that antioxidants contained in commercial grade polyolefins can inhibit the reinforcement promotion action of the promoters. A comparison of the data between Parts A and B reveals that TTA and PTA have little or no beneficial effects in a highly stabilized PP but produce substantial improvements in both tensile, elongation and impact properties in antioxidant-free PP. In general, therefore, and especially in a less thermally stable polyolefin such as polypropylene, any desired antioxidant addition should occur after the mechano-chemical effects of the reinforcement promoter grafting to the matrix resin have had an opportunity to take place.

EXAMPLE 8

A treated, filled thermoplastic polymer composition of about 1.5 weight percent TTA, about 58.5 weight percent ATH and about 40 weight percent HDPE I, was prepared and tested as in Example 1 yielding the following results:

TABLE 8A

| Tensile Strength (psi) | Tensile Modulus (ksi) | Elongation at Break (%) | Izod Impact Strength (ft-lbs/in.) |
|---|---|---|---|
| (ATH/HDPE I) | | | |
| 5,110 | 391 | 25 | 4.5 |

The mechanical properties of the composition are surprisingly good considering the high ATH loading. No reference data could be obtained since the untreated control sample was too dry and stiff to achieve compounding.

A high ATH-loading is desirable if the flame retardent properties of ATH are to be fully utilized. The effect of ATH-concentration on the oxygen index and UL-94 flammability ratings is described in an article by B. L. Glazar, E. G. Howard, and J. W. Collette entitled, "The Flammability Characteristics of Highly Mineral Filled Ultrahigh Molecular Weight Polyethylene Composites", in the Journal of Fire and Flammability, Vol. 9, October 1978, at pages 430–444, in which it is reported that the effect of ATH on flame retardancy increases steeply above 50 weight percent ATH. Using the previously referred to technique, by Housslein and Fallick, for directly polymerizing ethylene on filler surface, polyethylenes were prepared with ATH contents up to 80 weight percent, much higher than has been feasible using conventional compounding of ATH into polylethylene at molecular weight ranges suitable for normal thermoplastic processing.

The following results illustrate the UL-94 flammability test data for the ATH filled HDPE composition produced as described above, as compared with unfilled HDPE I controls.

TABLE 8B (ATH/HDPE I Flame Ratings)

| Sample Thickness (Inches) | ATH (wt. %) | Limiting Oxygen Index[1] | UL-94 Rating[2] |
|---|---|---|---|
| ⅛ | 0 | 18 | NR |
| ⅛ | 60 | 26 | VI/VO |
| ¼ | 0 | 18 | NR |
| ¼ | 60 | 26 | VO |

[1]Lists the percent of oxygen required to sustain combustion.
[2]Using a vertical flame test from Underwriters Laboratories with the following designations:
NR — not rated by test since sample continues to burn
VI - less than 25 seconds of burning with no drip
VO - less than 5 seconds of burning with no drip.

The sample represents a successful attempt at compounding a heat formable, highly flame-retarded polyolefin with excellent mechanical properties which is free of noxious and corrosive combustion gases resulting from halogen-containing, flame-retardent additives.

EXAMPLE 9

As shown in previous examples, TAHT is a reinforcement promoter which is highly effective for a broad range of filled resin compositions. Unfortunately, TAHT is a crystalline solid under normal operating conditions and has low solubility in organic solvents or other compounding additives. To assure uniform treatment of the fillers it may be advantageous for ease of compounding to utilize a more soluble reinforcement promoter than pure TAHT. To accomplish this, several mixed structure hexahydro-s-triazines were prepared from mixtures of acrylonitrile and methacrylonitrile using the synthetic procedure previously used to make TAHT. This procedure involves reacting a molar amount of trioxane equivalent to the sum of the number of moles of acrylonitrile and methacrylonitrile, in hexane solvent using a catalytic amount of sulfuric acid/acetic anhydride mixture. The resulting mixed structures have depressed melting point properties and improved solubility as compared with TAHT. Treated, filled polymer compositions containing about 1.0 weight percent of these triazines, about 49 weight percent Clay I, and about 50 weight percent HDPE I exhibited the following properties. The mole fraction of acrylonitrile refers to the ratio of moles of acrylonitrile to the total moles of acrylonitrile and methacrylonitrile in the reactant mixture.

TABLE 9

(Clay I/HDPE I)

| Mole Fraction of Acrylonitrile | Tensile Strength (psi) | Tensile Modulus (ksi) | Elongation at Break (%) | Izod Impact Strength (ft-lbs/in.) |
|---|---|---|---|---|
| No treatment | 3,610 | 292 | 4 | 0.6 |
| 1.00 (TAHT) | 5,040 | 354 | 40 | 3.4 |
| 0.80 | 4,900 | 352 | 46 | 3.5 |
| 0.75 | 4,870 | 353 | 38 | 3.6 |
| 0.67 | 4,700 | 338 | 50 | 2.8 |

The results indicate that the use of more soluble mixed triazines, as compared with pure TAHT, produces little or no reduction in the reinforcement promotion effect of pure TAHT.

EXAMPLE 10

This example illustrates that improvement in the stiffness, impact strength and burst strength can be achieved simultaneously in extruded, high density polyethylene pipe when using low-cost hydrous clay as the filler and TAHT as the reinforcement promoter. Hydrous clay is a non-reinforcing filler in polyolefin when used alone.

The composition was prepared by charging 50 lbs. of Clay I to a Henschel mixer. The mixer was operated at low speed initially while a solution containing 0.500 lbs. of TAHT in 2.5 l of dichloromethane was slowly added to assure uniform distribution. An exhaust fan was then connected and the mixer was turned to high-speed operation while the temperature of the mixture was raised from ambient to 100° C. After five minutes, the mixing speed was reduced to low-speed operation with mixing and drying being continued for another 10 minutes. 25 lbs. of the resulting TAHT-treated clay was then blended with 75 lbs. of HDPE II resin powder in a rotating drum for 10 minutes. The blend was then fed to a twin-screw, compounding extruder with temperatures of the rear of the barrel at about 193° C., and with the middle and front barrel at about 215° C. The multistrand die was kept at about 215° C. The treated, filled polymer composition was extruded in strands which were diced-in-line to standard ⅛" by ⅛" size pellets.

These pellets were then extruded into nominal 1" diameter pipe using a Davis-Standard extruder having a 2½" barrel diameter and a 24 to 1 fluted mixing screw ratio, under the following operating conditions:

| | |
|---|---|
| Barrel Temperatures | |
| Zone 1 | 205° C. |
| Zone 2 | 210° C. |
| Zone 3 | 207° C. |
| Zone 4 | 210° C. |
| Zone 5 | 215° C. |
| Screen Pack 20/60 mesh | |
| Die Temperature | 217° C. |
| Stock Temperature | 225° C. |
| Screw Speed | 32 rpm |
| Throughput Rate | 79 lbs./hr. |

The resulting pipe had a 1.8" O.D. with a wall thickness of 0.0074" having a smooth surface inside and outside. No gels, die plate-out, smoking, or odor problems were encountered during the extrusion. The resulting pipe was tested as is for and for burst strength using compression molded plaques made from granulated extrudate for the other properties, and compared with unfilled HDPE II pipe with the following results:

TABLE 10

(Clay I/HDPE II Pipe)

| | Test Compositions | |
|---|---|---|
| | Unfilled (wt. %) | Filled (wt. %) |
| Composition | | |
| HDPE II | 100 | 74.75 |
| Clay I | — | 25.00 |
| TAHT | — | 0.25 |
| Properties | | |
| Tensile Modulus, ksi | 120 | 170 |
| Izod Impact Strength, ft-lbs/in. | 1.9 | 3.9 |
| Yield Strength, psi | 3270 | 4000 |
| Instant Burst Strength, psi | 3500 | 4050 |
| Long Term Time to Burst, hrs | 36 | 594 |

TABLE 10-continued

| (Clay I/HDPE II Pipe) | Test Compositions | |
|---|---|---|
| | Unfilled (wt. %) | Filled (wt. %) |
| (at 1975 psi Hoop Stress) | | |

The results show that using a TAHT reinforcement promoter enables improvements in both stiffness and toughness as well as burst strength to be obtained for treated, clay-filled HDPE in contrast to unfilled HDPE. Untreated, clay-filled HDPE exhibits a reduction in impact and burst strength as compared with unfilled HDPE.

EXAMPLE 11

The following talc-filled HDPE I compositions were prepared and tested as in Example 1.

TABLE 11

| (Talc I/HDPE I) | | | | | |
|---|---|---|---|---|---|
| Treating Agent Type (Table I, II or III) | Treating Agent | Tensile Strength (psi) | Tensile Modulus (ksi) | Elongation at Break (%) | Izod Impact Strength (ft-lbs/in.) |
| — | None | 4,160 | 339 | 4.1 | 1.6 |
| I | MTA | 5,090 | 401 | 6.6 | 2.5 |
| II | ABA | 4,450 | 378 | 3.3 | 1.0 |
| III | ISTA | 4,170 | 312 | 4.1 | 1.2 |

The results show that talc, which is a naturally hydrophobic mineral filler traditionally unresponsive towards many traditional coupling agents, responds with significant improvements in all the tested properties when treated with a reinforcement promoter, MTA, within the present invention. In contrast, other treating agents, such as ABA, cause only moderate improvements in tensile properties at an expense in ductility and toughness.

EXAMPLE 12

In this example, two non-reinforcement promoters, MAH and TETA, were reacted in situ on a calcium carbonate filler surface. The resulting compound, however, which is considered to be a maleamic acid adduct of TETA, meets the criteria for being a reinforcement promoter within the present invention, having values for n of 3 to 4, for Q of about 1.2, for e of about 1.5, and for $R_f^\circ$ of less than or equal to about 0.01.

The treatment procedure involves first dissolving MAH in diethyl ether, mechanically stirring the solution into calcium carbonate powder and allowing the mixture to dry overnight at room temperature. TETA is dissolved in dichloromethane, stirred into the MAH-treated $CaCO_3$ powder mixture and then allowed to dry overnight at room temperature. The total concentration of MAH/TETA was maintained at 2 weight percent of the $CaCO_3$ I filler while the ratio between the MAH an TETA was varied as indicated in Table 12. Compounding and testing was done as in Example 1.

TABLE 12

| ($CaCO_3$ I/HDPE I) | | | | | |
|---|---|---|---|---|---|
| MAH (wt. %) | TETA (wt. %) | Tensile Strength (psi) | Tensile Modulus (ksi) | Elongation at Break (%) | Izod Impact Strength (ft-lbs/in.) |
| 0.00 | 0.00 | 2,980 | 258 | 26 | 0.7 |
| 0.80 | 1.20 | 3,320 | 282 | 36 | 0.6 |

TABLE 12-continued

| ($CaCO_3$ I/HDPE I) | | | | | |
|---|---|---|---|---|---|
| MAH (wt. %) | TETA (wt. %) | Tensile Strength (psi) | Tensile Modulus (ksi) | Elongation at Break (%) | Izod Impact Strength (ft-lbs/in.) |
| 1.15 | 0.85 | 4,200 | 281 | 52 | 1.3 |
| 1.34 | 0.66 | 4,360 | 280 | 88 | 3.6 |
| 1.46 | 0.54 | 4,410 | 275 | 59 | 3.7 |
| 2.00 | 0.00 | 3,820 | 261 | 21 | 0.8 |

The mixture producing the best results occurs at a MAH:TETA mole-ratio of about 3:1, while the mechanical properties are lower at both low mole-ratios of MAH to TETA and for MAH alone. These results clearly demonstrate that although TETA and MAH by themselves are not reinforcement promoters, their reaction products are very effective reinforcement promoters. The reinforcement promoters of the present invention therefore include those chemicals which may be formed in situ during the treatment of the filler or during compounding, using additives which by themselves are not within the definition of reinforcement promoters within the present invention since they do not satisfy Equation (A), as long as the reaction products satisfy the structure and parametric equations characterizing the claimed invention.

What is claimed is:

1. A polymer composition substantially free of a free radical initiator or its residue comprising a thermoplastic polymer, selected from the groups consisting *of* normally [of] solid hydrocarbon polymers, polyamides and polyvinyl chlorides including the copolymers of the latter with vinyl acetate and an inorganic filler having an average particle size $<100\ \mu m$ wherein the improvement comprises providing about 0.1 to 5 weight % based on the weight of the total composition of a reinforcement promoter having at least two reactive olefinic double bonds, said promoter being characterized by having a promoter index, P, being greater than zero, which is defined by the formula:

$$P=n(n-1)Q(e+2)(1-2R^\circ_f)-2.5$$

wherein n is the number of olefinic double bonds in the promoter, having [values ≧] *a value of at least* 2, Q and e are the Alfrey-Price resonance and polarity parameters, respectively, of at least one of the olefinic double bonds in the compound, wherein Q[≧2]>*0* and e[≧2 but <4,]>*0* and $R^\circ_f$, having [values≧0 to ≦] *a value* <0.5, is the relative flow ratio of the promoter measured by thin layer chromatography on a neutral silica gel using xylene as the eluant and di-n-butyl fumarate as the standard.

2. The composition of claim 1 wherein the thermoplastic polymer is a hydrocarbon homopolymer or copolymer.

3. The composition of claim 2 wherein the hydrocarbon polymer is a polyolefin homopolymer or copolymer, or a natural or synthetic rubber.

4. The composition of claim 1 wherein the reinforcement promoter has the structure:

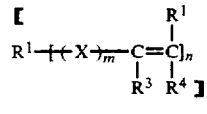

-continued

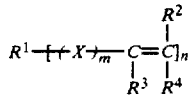

wherein $R^1$ is an organic group free of olefinic or acetylenic unsaturation having a valence of n; $R^2$, and $R^3$ and $R^4$ are hydrogen, carboxy or monovalent organic groups free of olefinic or acetylenic unsaturation; X is:

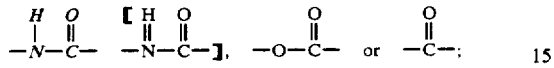

m has a value of 0 or 1; and n has a value of at least two.

5. The composition of claim 4 wherein the reinforcement promoter has an [R'] $R^1$ or X group, for when m is 1 or 0, respectively, which contains a double or triple bond which is in conjugation with the olefinic bond and which is electron withdrawing.

6. The composition of claim 1 wherein the reinforcement promoter is a condensation product of an acrylic or maleamic acid with an aliphatic, aromatic or heterocyclic polyol; or an acrylamide, maleimide or maleamic acid of an aliphatic, aromatic or heterocyclic polyamine.

7. The composition of claim 6 wherein the reinforcement promoter compound is an imide, maleate, acrylate, or acryloyl heterocyclic compound.

8. The composition of claim 7 wherein the reinforcement promoter is epoxidized linseed oil/acrylate, 1,3,5-triacryloylhexahydro-s-triazine, melamine triacrylate or maleamic acid derivatives of methylene-aniline oligomers.

9. The composition of claim 1 wherein the inorganic filler is aluminum trihydrate, clay, talc or calcium carbonate.

10. The composition of claim 1 wherein the reinforcement promoter is present in an amount of from about 0.1 to 5.0 weight percent, the filler is from about 10 to 90 weight percent and the thermoplastic polymer is from about 10 to 90 weight percent, based on the total weight of promoter, filler and polymer in the composition.

11. A reinforced polymer composition substantially free of a free radical initiator or its residue comprising a thermoplastic polymer *selected from the group consisting of normally solid hydrocarbon polymers, polyamides and polyvinyl chlorides including the copolymers of the latter with vinyl acetate* and an inorganic filler *having an average particle size* $<100$ *μm* wherein the improvement comprises providing *about 0.1 to 5 weight % based on the weight of the total composition of* a reinforcement promoter at the boundary between the filler and polymer, for increasing the strength and ductility of the filled thermoplastic polymer, wherein the promoter has at least two reactive olefinic double bonds, and wherein said promoter is characterized by having a promoter index, P, being greater than zero, and which is defined by the formula:

$$P = n(n-1)Q(e+2)(1-2R_f^\circ)-2.5$$

wherein n is the number of olefinic bonds in the promoter, *having a value of at least 2,* Q and e are the Alfrey-Price resonance and polarity parameters, respectively, for at least one of the olefinic double bonds in the promoter, *wherein* $Q>0$ *and* $e>0$, and $R_f^\circ$, *having a value* $<0.5$, is the relative flow ratio of the promoter measured by thin layer chromatography on a neutral silica gel using xylene as the eluant and di-n-butyl fumarate as the standard.

12. A process for making a reinforced, filled polymeric composition comprising:

(a) admixing a filler *having an average particle size* $<100$ *μm* with a reinforcement promoter having at least two reactive olefinic double bonds, wherein said promoter is characterized by having a promoter index, P, being greater than zero, and which is defined by the formula:

$$P = n(n-1)Q(e+2)(1-2R_f^\circ)-2.5$$

wherein n is the number of olefinic double bonds in the promoter, *having a value of at least 2,* Q and e are the Alfrey-Price resonance and polarity parameters, respectively, of at least one of the olefinic double bonds in the promotor, *wherein* $Q>0$ *and* $e>0$, and $R_f^\circ$, *having a value* $<0.5$, is the relative flow ratio of the promotor measured by thin layer chromatography on a neutral silica gel using xylene as the eluant and di-n-butyl fumarate as the standard;

(b) compounding the filler and promoter mixture with a thermoplastic polymer *selected from the group consisting of normally solid hydrocarbon polymers, polyamides and polyvinyl chlorides including the copolymers of the latter with vinyl acetate* for a time sufficient to generate a reinforced, filled thermoplastic polymer having increased strength and ductility;

(c) wherein said admixing and compounding is carried out in the substantial absence of any free radical initiator.

13. The process of claim 12 wherein the filler and promoter are admixed simultaneously to the compounding with the thermoplastic polymer.

14. The process of claim 12 wherein the reinforcement promoter is formed in situ during mixing with the filler or during compounding with the polymer.

15. The use of a reinforcement promoter in a filled thermoplastic polymer, *selected from the group consisting of normally solid hydrocarbon polymers, polyamides and polyvinyl chlorides including the copolymers of the latter with vinyl acetate,* composition substantially free of a free radical initiator or its residue wherein the improvement comprises providing a reinforcement promoter having at least two reactive olefinic double bonds, said promoter being characterized by having a promoter index, P, being greater than zero, and which is defined by the formula:

$$P = n(n-1)Q(e+2)(1-2R_f^\circ)-2.5$$

wherein n is the number of olefinic double bonds in the promoter, *having a value of at least 2,* Q and e are the Alfrey-Price resonance and polarity parameters, respectively, of at least one of the olefinic double bonds in the promoter, *wherein* $Q>0$ *and* $e>0$, and $R_f^\circ$, *having a value* $<0.5$, is the relative flow ratio of the promoter measured by thin layer chromatography on a neutral silica gel using xylene as the eluant and di-n-butyl fumarate as the standard.

*16. The composition of claim 1 wherein the Alfrey-Price resonance parameter, Q, is* $\geqq 0.4$.

*17. The composition of claim 16 wherein the number of olefinic bonds, n, is at least 3 and the relative flow ratio, $R^{\circ}_{f}$, is $<0.05$.*

*18. The composition of claim 11 wherein the Alfrey-Price resonance parameter, Q, is $\geqq 0.4$.*

*19. The composition of claim 18 wherein the number of olefinic bonds, n, is at least 3 and the relative flow ratio, $R^{\circ}_{f}$, is $<0.05$.*

*20. The process of claim 12 wherein the Alfrey-Price resonance parameter, Q, is $\geqq 0.4$.*

*21. The process of claim 20 wherein the number of olefinic bonds, n, is at least 3 and the relative flow ratio, $R^{\circ}_{f}$, is $<0.05$.*

*22. The process of claim 15 wherein the Alfrey-Price resonance parameter, Q, is $\geqq 0.4$.*

*23. The process of claim 22 wherein the number of olefinic bonds, n, is at least 3 and the relative flow rate, $R^{\circ}_{f}$, is $<0.05$.*

* * * * *